(12) United States Patent
Yahav et al.

(10) Patent No.: US 8,988,508 B2
(45) Date of Patent: Mar. 24, 2015

(54) WIDE ANGLE FIELD OF VIEW ACTIVE ILLUMINATION IMAGING SYSTEM

(75) Inventors: Giora Yahav, Haifa (IL); David Cohen, Nesher (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 639 days.

(21) Appl. No.: 12/889,479

(22) Filed: Sep. 24, 2010

(65) Prior Publication Data

US 2012/0075427 A1 Mar. 29, 2012

(51) Int. Cl.
| | |
|---|---|
| H04N 7/00 | (2011.01) |
| H04N 5/225 | (2006.01) |
| G06F 3/01 | (2006.01) |
| H04N 5/232 | (2006.01) |
| G01S 17/87 | (2006.01) |
| G01S 17/89 | (2006.01) |
| G06K 9/20 | (2006.01) |
| H04N 13/02 | (2006.01) |
| H04N 15/00 | (2006.01) |

(52) U.S. Cl.
CPC .............. *H04N 5/2256* (2013.01); *G06F 3/017* (2013.01); *H04N 5/23238* (2013.01); *G01S 17/87* (2013.01); *G01S 17/89* (2013.01); *G06F 3/011* (2013.01); *G06K 9/209* (2013.01); *H04N 13/0239* (2013.01); *H04N 13/0242* (2013.01); *H04N 13/0253* (2013.01); *A63F 2300/1093* (2013.01)
USPC ............................................. 348/47; 348/38

(58) Field of Classification Search
USPC ......................................................... 348/47
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Sath V Perungavoor
*Assistant Examiner* — Howard D Brown, Jr.
(74) *Attorney, Agent, or Firm* — Gregg Wisdom; Judy Yee; Micky Minhas

(57) ABSTRACT

An embodiment of the invention provides an active illumination imaging system comprising a first camera and a second camera, each having an optical axis and a field of view (FOV) characterized by a view angle in a plane that contains the optical axis and wherein the optical axes of the cameras intersect at an intersection region common to their FOVs at an angle substantially equal to half a sum of their view angles.

19 Claims, 6 Drawing Sheets

(56) References Cited

U.S. PATENT DOCUMENTS

| | | |
|---|---|---|
| 4,772,942 A | 9/1988 | Tuck |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,532,737 A | 7/1996 | Braun |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,638,461 A * | 6/1997 | Fridge ................. 382/141 |
| 5,641,288 A | 6/1997 | Zaenglein |
| 5,657,073 A | 8/1997 | Henley |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,937,212 A * | 8/1999 | Kurahashi et al. ........... 396/20 |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,304,285 B1 | 10/2001 | Geng |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,738,073 B2 | 5/2004 | Park et al. |
| 6,744,569 B2 | 6/2004 | Geng |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,084,904 B2 * | 8/2006 | Liu et al. .................... 348/218.1 |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |

(56) References Cited

U.S. PATENT DOCUMENTS

| | | | |
|---|---|---|---|
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| 7,893,957 B2* | 2/2011 | Peters et al. | 348/144 |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,059,185 B2* | 11/2011 | Nose | 348/335 |
| 8,072,470 B2 | 12/2011 | Marks | |
| 8,328,653 B2* | 12/2012 | Lock | 473/199 |
| 2004/0027450 A1 | 2/2004 | Yoshino | |
| 2005/0117015 A1* | 6/2005 | Cutler | 348/38 |
| 2006/0210015 A1* | 9/2006 | Pelc et al. | 378/9 |
| 2007/0146530 A1 | 6/2007 | Nose | |
| 2008/0026838 A1 | 1/2008 | Dunstan et al. | |
| 2008/0144968 A1 | 6/2008 | Cohen et al. | |
| 2009/0128833 A1 | 5/2009 | Yahav | |
| 2010/0033811 A1* | 2/2010 | Westphal et al. | 359/368 |
| 2010/0110069 A1 | 5/2010 | Yuan | |
| 2010/0238263 A1* | 9/2010 | Robinson et al. | 348/14.08 |
| 2011/0080490 A1* | 4/2011 | Clarkson et al. | 348/222.1 |
| 2011/0298900 A1* | 12/2011 | Inaba | 348/47 |
| 2012/0075427 A1* | 3/2012 | Yahav et al. | 348/47 |
| 2012/0154573 A1* | 6/2012 | Cohen | 348/135 |
| 2013/0188022 A1* | 7/2013 | Katz et al. | 348/47 |

FOREIGN PATENT DOCUMENTS

| | | |
|---|---|---|
| EP | 1231780 A2 | 8/2002 |
| JP | S60-172888 | 9/1985 |
| JP | 08044490 A1 | 2/1996 |
| JP | 2005099572 A | 4/2005 |
| JP | 2010206643 A | 9/2010 |
| KR | 100693316 B1 | 3/2007 |
| WO | 93/10708 A1 | 6/1993 |
| WO | 97/17598 A1 | 5/1997 |
| WO | 99/44698 A1 | 9/1999 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real-World Disorders", The Washington Post, Mar. 27, 1995, Science Psychology, 2 pages.

"Simulation and Training", 1994, Division Incorporated.

System Design of Time-of-Flight Range Camera for Car Park Assist and Backup Application; Acharya, Sunil et al.; Canesta Inc., 2008: http://www.canesta.com/assets/pdf/technicalpapers/SystemDesignofTOFRangeCameraforBackupApplication.pdf.

"FOV Diameter and Limiting Magnitude for Telescopic Positional Observation"; Jun. 17, 2003: http://www.satobs.org/seesat/Jul-2003/0132.html.

"International Search Report", Mailed Date: Apr. 17, 2012, Application No. PCT/US2011/052759, Filed Date: Sep. 22, 2011, pp. 11.

Office Action from Chinese Application 201110296188.5, dated Feb. 28, 2014.

"Office Action Received for European Patent Application No. 11827536.1", Mailed Date: Aug. 29, 2014, 11 Pages.

"Search Report Received for European Patent application No. 11827536.1", Mailed Date: Jul. 30, 2014, 9 Pages.

Littlefield, Rik, "Theory of the "No-Parallax" Point in Panorma Photography", Published on: Feb. 6, 2006, Available at: http://www.janrik.net/PanoPostings/NoParallaxPoint/TheoryOfTheNoParallaxpoint.pdf.

* cited by examiner

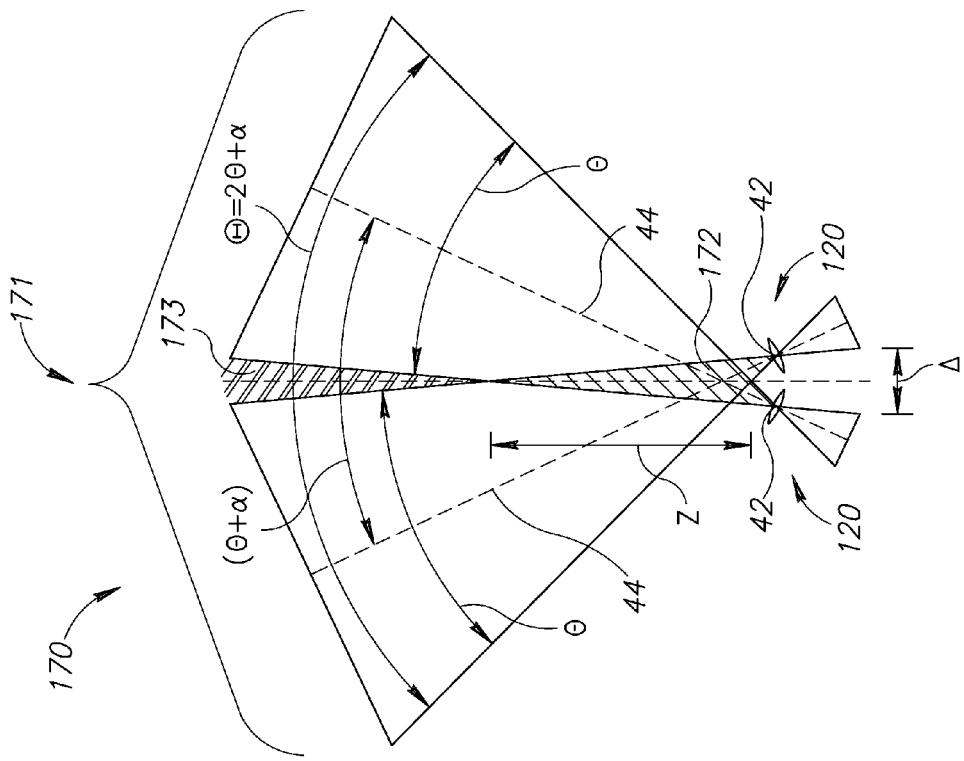
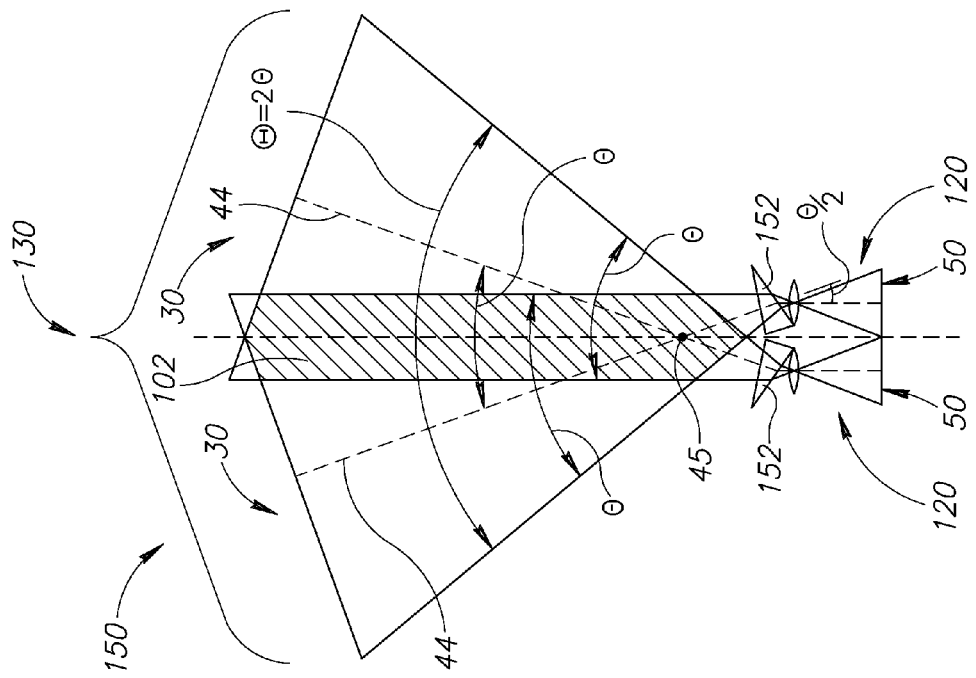

WIDE ANGLE FIELD OF VIEW ACTIVE ILLUMINATION IMAGING SYSTEM

TECHNICAL FIELD

Embodiments of the invention relate to active illumination imaging systems that transmit light to illuminate a scene and image the scene with light that is reflected from the transmitted light by features in the scene.

BACKGROUND

Various types of active illumination cameras or imaging systems, generically referred to as "active illumination cameras", that comprise their own light source for illuminating a scene that they image with "artificial light", are known. Among such active illumination cameras are the ubiquitous flash cameras, gesture recognition cameras, and three-dimensional (3D) cameras. Gesture recognition cameras illuminate a person to image and recognize the person's gestures. 3D cameras image a scene with light they generate to determine distances to features in the scene. Depending on the mode of operation of a 3D camera, light provided by the camera's light source may be spatially modulated light referred to as structured light, such as typically used by triangulation type 3D cameras, or temporally modulated light, such as light transmitted in pulses, typically used by various types of time of flight (TOF) 3D camera.

For many applications, such as for tracking a person's gestures to interface the person with a computer, preferred design specifications for an active illumination camera can be antagonistic, and accommodating such competing design preferences can be expensive.

For example, for gesture tracking and/or 3D imaging to interface a person with a computer game, it is often desirable for an active illumination camera to have a relatively large field of view (FOV) characterized by a wide view angle, in which the person can move freely and still accurately be imaged by the camera. The FOV of a camera is a region of space defined by a solid angle that extends from an optical center of the camera and for which points therein are imaged by the camera's optical system on a photosensitive sensor, hereinafter a "photosensor", that the camera comprises. A view angle of a camera's FOV is a largest possible angle between lines that lie in the camera's FOV and extend from the camera's optical center. A view angle may be defined for any plane that intersects the camera's optical center. View angles are generally defined for planes that contain the camera's optical axis. Practical view angles for imaging human activities are usually horizontal and vertical view angles defined for planes respectively parallel and perpendicular to the ground. It can be advantageous for the FOV to be characterized by a wide view angle, often a wide horizontal view angle as large as 90°, 120°, or 150°.

To provide the camera with a wide angle FOV and accurate imaging, the camera usually has an optical system comprising a lens or lens system having a small effective focal length "f", and a relatively large photosensor, having a large number of photosensitive pixels. An effective focal length of an optical system is a focal length of a thin lens equivalent of the optical system that can be used to represent functioning of the optical system.

However, illuminating a large FOV with light from the camera's light source is generally both technically and cost-wise challenging. Intensity of illumination provided by the light source is usually limited by cost considerations and heat dissipation requirements for maintaining the light source, and camera, at an acceptable operating temperature. Amounts of light from the light source reflected by the person and other features in the camera's FOV are therefore usually limited.

To compensate for limited illumination, the camera may have enhanced light collecting efficiency and registration capacity so that amounts of reflected light registered by pixels in the camera's photosensor are sufficient for signals the pixels generate to have acceptable signal to noise ratios (SNRs). Light collecting efficiency is a measure of an intensity (optical energy per unit area) of light imaged on the camera photosensor from that portion of light collected by the camera lens per unit area of an object that the camera images. Light registration capacity is a measure of how much signal that a pixel in the camera's photosensor produces per unit of optical energy that the camera images on the pixel and has units of signal magnitude per unit of optical energy. A product of a camera's light collecting efficiency and light registration capacity is a measure of the camera's sensitivity to light from a scene that it images and is referred to as the camera's light acquisition sensitivity (LAS).

Light collecting efficiency and registration capacity can be enhanced by lowering the f number (f#) of the camera lens and increasing the size of pixels in the camera's photosensor. A lens f# is equal to the lens's focal length, f, divided by a diameter, D, of its aperture—that is f#=f/D. Aperture diameter D may be controlled by any of various diaphragms and stops. A minimum f# refers to an f# for a maximum possible D, usually a diameter close to a physical diameter of the lens.

Conventional digital cameras that image a scene in daylight and/or with light from a conventional flash have FOVs characterized by view angles between about 40° and about 60°, comprise square pixels having side dimensions between 1.2µ-6µ (microns), and minimal f#s equal to between 2.8-3.5. For gesture recognition and multiplayer video game applications on the other hand, it can be advantageous for an active illumination camera having a wide angle FOV to have an f# less than about 2, and large pixels having a side dimension greater than or equal to about 7.5 microns.

However, decreasing a camera's f# and increasing its pixel size generally decreases camera resolution and introduces optical distortions in images acquired by the camera unless the camera's optical system is specially designed to compensate for the distortions. Configuring the camera to moderate optical distortions can be technically difficult and involve costs that price the camera out of its intended market.

SUMMARY

An embodiment of the invention provides a wide view angle FOV, active illumination imaging system, also referred to as a "compound active illumination camera" or a "compound camera", that combines the FOVs of a plurality of cameras, referred to as "component cameras", to provide an enlarged "compound" FOV.

In an embodiment of the invention the plurality of component cameras comprises two component cameras positioned so that their optical axes intersect in a region, hereinafter an "intersection region", common to the FOVs of the component cameras at an angle between the optical axes equal to about half a sum of the angles of views of the cameras in a plane defined by the optical axes. The FOVs of the component cameras cross over each other and combine to provide an enlarged compound FOV having a wide view angle in the plane of the optical axes that is equal to about twice the view angle of the FOV of each component camera. Optionally, the angles of view of the FOVs of the component cameras are equal, and the FOVs mirror each other in a "mirror" plane that passes through the intersection of their optical axes, is perpendicular to their plane, and contains a line that bisects the angle between the axes.

In an embodiment of the invention, the component cameras are spaced close to each other so that their FOVs overlap along a narrow seam that includes the mirror plane. The resulting compound FOV is substantially free of regions that are not imaged by at least one of the compound cameras. In an embodiment of the invention, each component camera is configured having a relatively small f#, and a photosensor comprising relatively large pixels so that the component camera has relatively enhanced light collection efficiency and registration capacity.

Whereas the compound active light camera enjoys an enlarged, wide view angle FOV, its light imaging is characterized by the f#s, photosensors, and image resolution of the component cameras. It therefore combines the wide angle compound FOV with the enhanced light collecting efficiency and registration capacity of the smaller FOVs of the component cameras without having to invest in accommodating competing and antagonistic design demands of a conventional camera having a similarly wide angle FOV.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

FIGS. 3A-3C schematically show other active illumination imaging systems, in accordance with an embodiment of the invention;

DETAILED DESCRIPTION

Figures 1A, 1B:
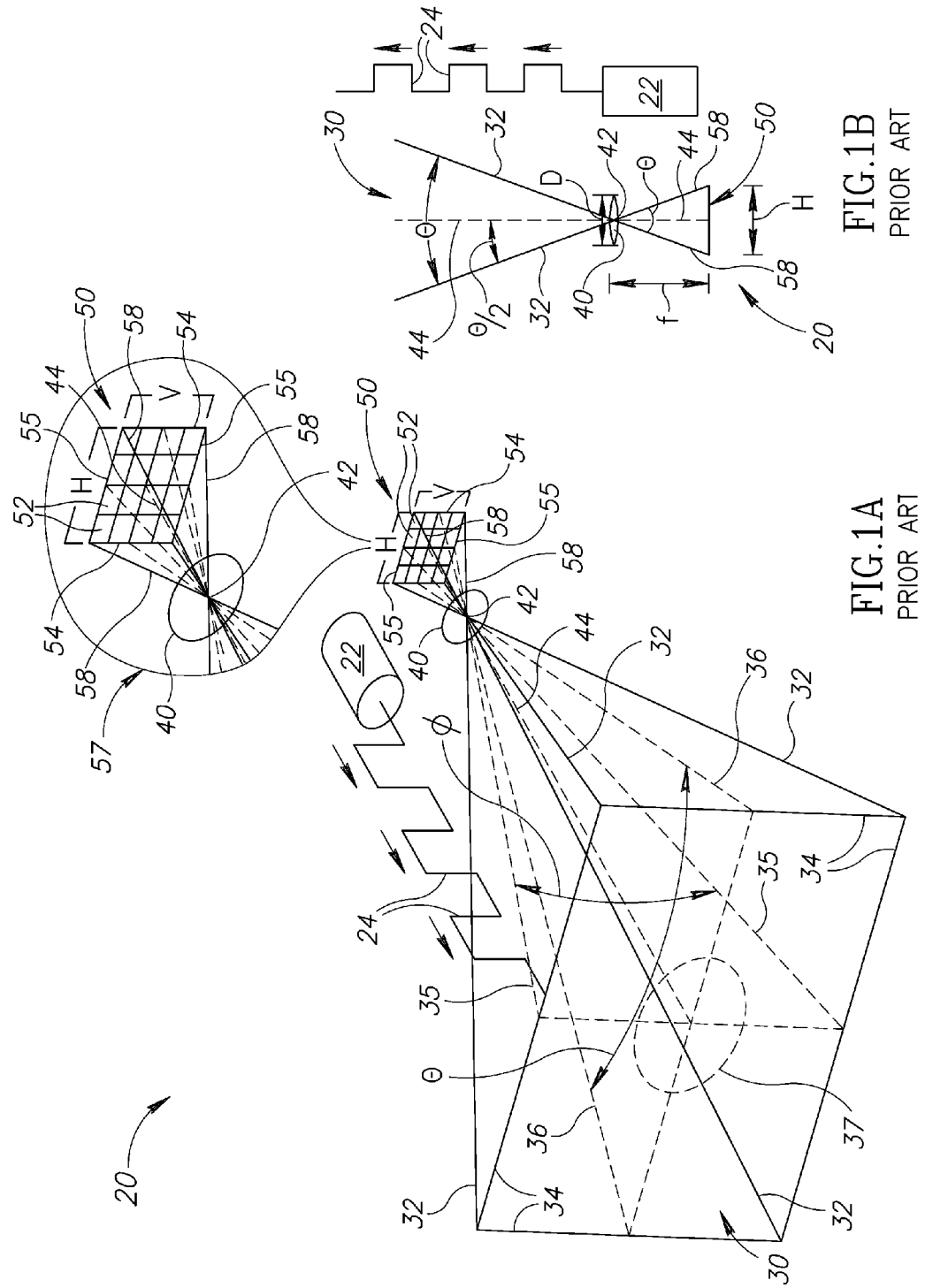
FIGS. 1A and 1B schematically show plan and perspective views respectively of a conventional 3D time of flight (TOF) camera for determining distances to features in a scene, in accordance with prior art.

Aspects of embodiments of the invention are discussed below with respect to figures of an active illumination imaging system, which is by way of example, a 3D time of flight (TOF) imaging system. FIGS. 1A and 1B schematically show perspective and plan views respectively of a conventional 3D TOF camera 20 and the camera's field of view (FOV). FIG. 2A to FIG. 5 schematically show how cameras, similar to that shown in FIGS. 1A and 1B, are combined and configured to provide an optionally 3D TOF, compound active illumination camera having an enlarged, wide angle compound FOV, in accordance with embodiments of the invention. Compound 3D TOF cameras similar to that shown in FIGS. 2A and 2B having a wide angle compound FOV in accordance with an embodiment of the invention are compared to 3D TOF cameras conventionally designed to have a wide angle FOV.

In the discussion unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

3D TOF camera 20 shown in FIGS. 1A and 1B comprises a light source 22 controllable to radiate a train of light pulses to illuminate a scene (not shown) within a FOV 30 of the camera. Light pulses radiated by light source 22 are schematically represented by square "pulses" labeled with a numeral 24 and associated with overhead arrows representing direction of propagation. Numeral 24 is also used when referring to the light pulses. Whereas light pulses 24 may comprise light provided by a suitable light emitting diode (LED) and/or laser from any portion of the spectrum, usually, light pulses 24 are near infrared (NIR) light pulses. Camera 20 comprises an optical system, represented by a lens 40, for imaging light from light pulses 24 that is reflected back to the camera by features in the scene onto a photosensor 50. Lens 40 has an optical center 42 and an optical axis 44, which are also an optical center and optical axis respectively of camera 20. Photosensor 50 comprises light sensitive pixels 52 (FIG. 1A). The optical system also includes a shutter (not shown) for shuttering the camera open and closed. Following a predetermined delay from a time at which each pulse 24 in the train of light pulses is radiated by light source 22 to illuminate the scene, the shutter opens the camera for a short exposure period to register light reflected from features in the scene that reaches the camera and is imaged by lens 40 onto photosensor 50. The imaged light registered by the camera is used to determine how long it takes light from a light pulse 24 to travel round trip from light source 22 to the features and back to 3D TOF camera 20. The round trip time and the speed of light are used to determine how far the features are from the camera.

In the perspective and plan views of FIGS. 1A and 1B, FOV 30 of camera 20 is schematically shown delimited by boundary lines 32. The boundary lines define planes that determine a pyramid shaped solid angle, which bounds and limits a volume of the FOV. Only points within the solid angle of FOV 30, and therefore within the volume bounded by the planes defined by boundary lines 32 are imaged by camera 20. Lines 34 connecting boundary lines 32, dashed lines 35 and 36, and circle 37 are shown to aid in visualizing the solid angle of FOV 30. Location of lines 34 and circle 37 do not indicate a limit to how far FOV 30 extends from camera 20. Delimiting boundary lines 32 and FOV 30 are conventionally understood to extend to "infinity".

The solid angle that defines the size and shape of FOV 30 is congruent to a pyramid shaped solid angle that photosensor 50 subtends at optical center 42 of lens 40. The solid angle is determined by size and shape of photosensor 50, and a focal length "f" (FIG. 1B) of lens 40. Photosensors typically have rectangular pixel arrays and photosensor 50 is shown as a rectangular pixel array having vertical edges 54 of length V and horizontal edges 55 of length H. The camera is, arbitrarily, considered to be oriented with vertical edges 54 perpendicular to the ground (not shown) and horizontal edges 55 parallel to the ground under normal operation of the camera. Line segments 58 (only some of which are labeled to reduce clutter in the figures) that extend from corners of photosensor 50 to optical center 42 of lens 40 define the solid angle that photosensor 50 subtends at the optical center and thereby the solid angle of FOV 30. Boundary lines 32 that define FOV 30 are extensions of line segments 58.

FOV 30 has a horizontal angular extent θ in a horizontal plane defined by dashed lines 36 that is parallel to horizontal edges 55 shown in FIG. 1A and contains optical axis 44. (It is noted that in the plan view of FIG. 1B, boundary lines 32 project onto, and are coincident with, dashed lines 36.) Dashed lines 36 pass through optical center 42 of lens 40 and intersect vertical edges 54 (FIG. 1A) of photosensor 50 at, optionally, their midpoints. An inset 57 schematically shows an enlarged view of lens 40 and photosensor 50 in which details of lines 58, photosensor 50, and lens 40 are more clearly shown. Angle θ is the angle between lines 36 and satisfies an equation $$\tan(\theta/2) = H/2f. \qquad 1)$$

Geometrical relationships between "horizontal" view angle θ of FOV 30, H/2, and f are shown in FIG. 1B.

FOV 30 similarly has a vertical angular extent in a plane defined by dashed lines 35 that contains optical axis 44 and is parallel to vertical edges 54 of photosensor 50. Lines 35 pass through optical center 42 of lens 40 and intersect horizontal edges 55, optionally, at their midpoints. Vertical view angle φ of FOV 30 is the angle between lines 35 and satisfies an equation, $$\tan(\phi/2) = V/2f. \qquad 2)$$

An amount of optical energy per unit time that is incident per unit area of an image of a feature of a scene produced by camera 20 on photosensor 50 is referred to as the irradiance "$I_R$" of the photosensor from the feature. If the feature is located at a distance "r" from the camera and gives off an amount of optical energy (an "amount of light") per unit area, per unit time, $I_E$, conventionally referred to as "exitance", then the irradiance "$I_R$" of photosensor 50 from the feature may be written $$I_R = I_E V \pi (D/2r)^2 [1/(f/r)]^2, \qquad 3)$$

where D is the diameter of lens 40 and "V" is a vignetting factor. The factor $\pi(D/2r)^2$ is the solid angle subtended by the lens at the feature. The quantity (f/r) is a magnification of the camera for a feature at distance r, and $(f/r)^2$ is a ratio of the area of the image of the feature on photosensor 50 relative to the area of a projection of the feature on a plane perpendicular to optic axis 44. Remembering that f#=f/D, the expression for $I_R$ becomes $$I_R = I_E V \pi / (4f\#^2). \qquad 4)$$

The vignetting factor V is a ratio equal to an amount of light collected from the feature and imaged on photosensor 50 divided by a maximum amount of light that could be collected and imaged for the feature by lens 40 were the feature located on optical axis 44 at a distance r from camera 20. The vignetting factor V is less than or about equal to one. It generally decreases with increasing displacement of the feature from optical axis 44 and increasing FOV view angle.

An average irradiance, "$\bar{I}_R$" for camera 20 responsive to light from the feature is determined by replacing V with its average "$\bar{V}$" over all possible positions of the feature in FOV 30 at distance r from the camera so that $\bar{I}_R = I_E \pi \bar{V}/(4f\#^2)$. The ratio, $$\bar{I}_R / I_E = (\pi/4)(\bar{V}/f\#^2) \qquad 5)$$

may be considered the average light collection efficiency of camera 20 for a feature located anywhere in the camera's FOV 30 at a distance r from the camera.

If pixels 52 in photosensor 50 have an area "$A_{px}$", and an amount of light from an imaged feature in the camera's FOV 30 that is incident on a pixel 52 is "$I_{px}$", then on the average, $I_{px} = A_{px} \bar{I}_R = I_E (\pi/4) \bar{V} A_{px}/(f\#^2)$. Let an "efficiency" of a pixel 52 for providing a signal from a given amount of incident light be represented by "k" and a signal generated by a pixel 52 from light incident on the pixel from the feature be represented by "$S_{px}$". The factor k may, for example, represent a number of electrons generated by a pixel 52 per unit of optical energy incident on the pixel. Then $kA_{px}$ is the registration capacity of a pixel 52 in the photosensor. For the imaged feature pixel 52 provides on the average, a signal, $$S_{px} = k I_{px} = k A_{px} \bar{I}_R = I_E k a_{px}(\pi/4) \bar{V}/(f\#^2) = (I_E)[k(\pi/4) A_{px} \bar{V}/(f\#^2)]. \qquad 6)$$

The factor $[k(\pi/4) A_{px} \bar{V}/(f\#^2)]$ is a measure of the camera's light acquisition sensitivity (LAS). Assuming k is the same for different configurations of a 3D TOF camera similar to 3D TOF camera 20, and dropping constant factors, $A_{px} \bar{V}/(f\#^2)$ may reasonably be used as a comparative figure of merit for comparing light acquisition sensitivities of different 3D TOF cameras. It is convenient to write the area $A_{px}$ in terms of its diagonal dimension "$d_{px}$" and therefore to define a light acquisition sensitivity, LAS, as $$LAS = \bar{V} d_{px}^2 / f\#^2, \qquad 8)$$

where $d_{px}$ is in units of microns.

By way of numerical example, a conventional 3D TOF camera similar to camera 20 optionally has a FOV 30 characterized by a moderate horizontal view angle θ equal to 62° and a vertical view angle φ equal to 77°. The camera images a scene on photosensor 50 having a horizontal dimension (H) optionally equal to 3.6 mm and a vertical dimension (V) optionally equal to 4.8 mm (A 3.6 mm×4.8 mm photosensor is traditionally referred to as a ⅓ inch=⅓" format photosensor because its diagonal is equal to 6 mm, which is about ⅓ of 16 mm, and a 16 mm diagonal photosensor is referred to as having a 1" format. The 16 mm diagonal is referred to as a 1" format sensor because legacy video camera tubes having 1" diameter that were used for imaging before the advent of CCDs had an effective imaging sensor diameter equal to 16 mm) Using equation 1) and horizontal view angle θ=62°, or equation 2) and vertical view angle φ=77°, focal length f of camera lens 40 is determined to be equal to 3 mm and it is optionally characterized by a minimum f# equal to 1.2.

A practical imaging resolution criterion for using 3D TOF camera 20 to image a scene and determine distances to features in the scene optionally requires that a surface area, hereinafter a "resolution patch", having a desired size and located at a desired working distance from the camera be imaged by the camera to an image having a desired image size on photosensor 50. The desired size for the resolution patch is chosen to define a spatial sampling pitch for distance measurements provided by 3D TOF camera 20. To interface a person with a computer using 3D TOF camera 20, a working distance might be 1 m (meter), and the resolution patch, optionally a square, 1 cm on a side.

The imaging resolution criterion optionally requires that an image of the resolution patch on photosensor 50 always completely cover at least one pixel 52 in the photosensor. The criterion operates to assure that at least one pixel 52 (FIG. 2A) in photosensor 50 has a maximum possible exposure to light from a resolution patch sized region of a feature that is located at the working distance and is imaged on the photosensor. The completely covered pixel is expected to generate a signal responsive to light from the patch sized region that has an optimum SNR and can therefore be used to provide a satisfactory distance measurement to the region and the feature. The resolution criterion is satisfied if an image of the resolution patch has a diagonal that is twice the length of a diagonal of pixels 52. For the 3 mm focal length of lens 40, pixels 52 having a side length equal to 15 microns (μ) satisfy the criterion. For the 3.6 mm×4.8 mm dimensions of photosensor 50, the photosensor comprises 240 horizontal "rows" and 320 vertical "columns" of the 15μ×15μ pixels.

For the numerical specifications of 3D TOF camera 20 given above, the camera has a vignetting factor equal to 0.81 and a value for LAS (light acquisition sensitivity) calculated using equation 8) that is equal to about 126. In practice, for a maximum working distance from camera 20 equal to about 3 m, a light source 22 controllable to radiate bursts of light pulses having a duty cycle of 50% and an average optical power of about 2.5 watts provides acceptable irradiance of pixels 52, for the camera specifications.

In accordance with an embodiment of the invention, a plurality of active illumination cameras is combined to provide a compound active illumination camera having a wide angle FOV.

Figures 2A, 2B:
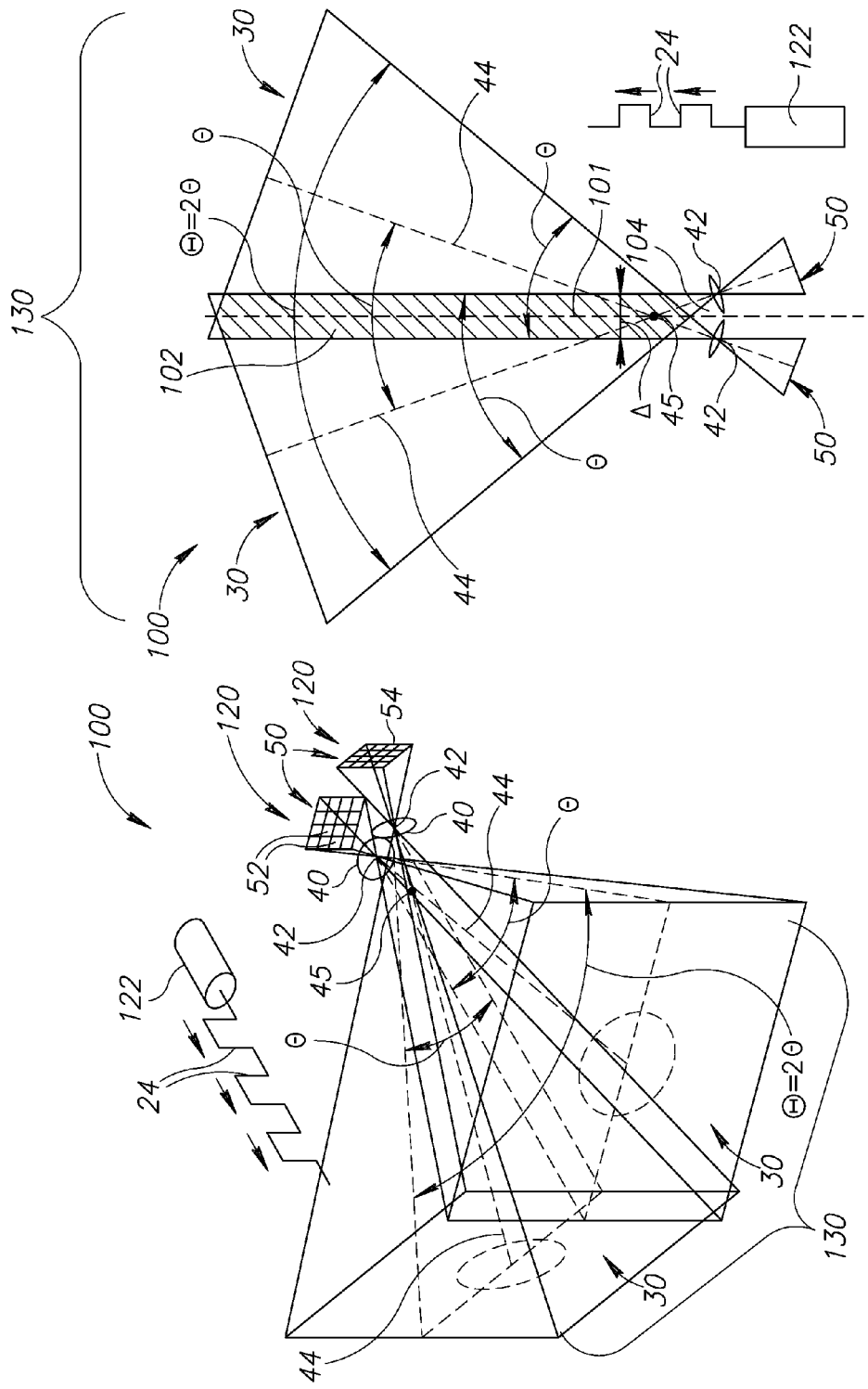
FIGS. 2A and 2B schematically show a compound 3D TOF camera as an example of an active illumination imaging system having a wide angle FOV, in accordance with an embodiment of the invention.

FIGS. 2A and 2B schematically show perspective and plan views respectively of a compound, wide angle 3D TOF camera 100 comprising two, optionally identical, component cameras 120, similar to camera 20, (FIGS. 1A and 1B), and a light source 122 for illuminating a scene (not shown) that the camera images, in accordance with an embodiment of the invention. The component cameras provide compound 3D TOF camera 120 with a compound FOV 130 having a horizontal view angle Θ that is twice the horizontal view angle θ of camera 20.

Component cameras 120 are mounted to a support frame (not shown) in which vertical edges 54 of their photosensors 50 are substantially parallel, and the cameras are rotated relative to each other so that their respective FOVs 30 "cross over" and their optical axes 44 intersect in an intersection region 45 common to the FOVs at an angle substantially equal to horizontal view angle θ of the component cameras. Axes 44 are considered to intersect if a distance between their points of closest approach is less than a desired upper bound distance. The intersection region is a sphere of smallest diameter that includes the points of closet approach. A plane of intersecting axes 44 is defined as a plane that is perpendicular to and bisects a line which joins their points of closest approach. An angle between intersecting axes 44 is an angle between their projections onto the plane that they define.

The desired upper bound distance of closest approach is a distance for which images generated by component cameras 120 are acceptable for an application for which compound 3D TOF camera 100 is to be used. Vertical edges 54 are considered substantially parallel if an angle between the edges is sufficiently small so that images generated by the component cameras 120 are acceptable for the application for which compound 3D TOF camera 100 is to be used. In practice, an upper bound distance of closest approach and a maximum acceptable deviation angle of vertical edges 54 from parallel are determined so that distortions in an image generated responsive to images provided by component cameras 120 processed using appropriate image processing algorithms do not preclude use of the images.

In an embodiment of the invention, to provide smooth stitching of images provided by component cameras 120, efficient use of the areas of their respective photosensors 50, and simplify image processing, it is advantageous that an upper bound distance of closest approach be less than about 20 times a length of a side of pixels 52. For example, for 15μ×15μ pixels 52, it is advantageous that a distance of closest approach for optical axes 44 be less than or equal to about 300μ (0.3 mm) Optionally, the distance of closest approach is less than about 15 times a side length of pixels 52. In some embodiments, the distance of closest approach is less than about 10 side lengths of pixels 52.

Similarly, in an embodiment of the invention, an upper bound angle for deviation of vertical edges 54 from being parallel is equal to about 20 times a length of a side of pixels 52 divided by a length of a side of photosensor 50. For the 15μ pixels 52 and 3.6 mm×4.8 mm dimensions of photosensor 50, an upper bound on the deviation angle is optionally equal to about 5°. Optionally, the upper bound deviation angle is equal to 2°. In some embodiments of the invention, the upper bound deviation angle is equal to 1°.

Component FOVs 30, are mirror images of each other in a plane that contains a line 101 (FIG. 2B), which bisects the angle between optical axes 44, and is perpendicular to their plane. Component FOVs 30 combine to form a compound FOV 130 having a horizontal view angle Θ=2θ, and a vertical view angle φ (not shown in FIG. 2A) equal to that of the component cameras.

The "crossover" configuration of component FOVs 30 in accordance with an embodiment of the invention, results in efficient stitching together of the component FOVs to provide large, wide angle compound FOV 130, in which, optionally, the component FOVs overlap only along a narrow, planar volume region 102. The overlap volume is referred to as "seam 102", and shown shaded in FIG. 1B. Width of seam 102 is equal to a distance Δ that separates optical centers 42 of component cameras 20. Distance Δ is optionally made relatively small so that seam 102 does not occupy a large portion of FOV 130. For example, Δ may be less than or equal to 10 cm. In some embodiments, separation distance Δ is less than or equal to 5 cm.

It is noted that a minimum distance for Δ is determined by how close cameras 120 can be "packed" together. A minimum "packing" distance and therefore minimum Δ are generally determined by sizes of components comprised in cameras 120. In some embodiments of the invention, cameras 120 are housed in a common housing, and a minimum packing distance may be determined by diameters of lenses 42. By way of example, lenses 42 may have diameters as small as two millimeters, resulting in a minimum packing distance and minimum Δ about equal to or less than five millimeters.

A dead region 104, which is not imaged by either compound camera 20, extends in front of component cameras 20. A volume of the dead region, and a distance that it extends in front of component cameras 20, decreases as Δ decreases. In some embodiments, separation distance Δ is determined so that an extent of the dead region, does not negatively affect satisfactory functioning of compound 3D TOF camera 100 for an application for which it is intended. For example, for interfacing a person with a computer it might be advantageous for the dead region to extend to a maximum distance of about 20 cm from a line joining optical centers 42 of component cameras 120.

It is noted that points located in seam 102 are imaged by both component cameras 120, and in embodiments of the invention the cameras are aligned and/or calibrated relative to each other responsive to distances provided by the component cameras for features of a scene located in the seam. For example, for features located in seam 102 at working distances from the component cameras, the cameras should provide substantially same distances. (At a working distance "WD" a fractional difference between distances of a same feature in seam 102 from the component cameras is less than $(\frac{1}{2})(\Delta/WD)^2$. The difference will generally be very small. For example, for WD=100 cm and Δ=5 cm, the difference is about a millimeter.) In accordance with an embodiment of the invention, positions of component cameras 120 relative to each other are adjusted, or misalignment of the cameras compensated for, so that both component cameras provide same distances to same features located in seam 102.

For component cameras 120, which by way of example as noted above determine round trip times for pulses 24 responsive to a delay time of an exposure period following each light pulse, calibrating cameras 120 optionally comprises adjusting timing of exposure periods of one camera 120 relative to exposure periods of the other camera 120. In some embodiments, adjusting relative timing between exposure periods comprises synchronizing the exposure periods. In some embodiments, adjusting timing comprises delaying exposure periods of one camera relative to exposure periods of the other camera.

Whereas compound 3D TOF camera 100 has a compound FOV 130 characterized by a horizontal view angle Θ that is twice the horizontal view angle θ of component cameras 120, it retains the focal length, f#, imaging resolution, and LAS value of the component cameras. Since FOV 130 has a volume substantially twice as large as that of a component FOV 30, light source 122 advantageously provides twice as much optical power as that provided by light source 22 of camera 20 shown in FIGS. 1A and 1B.

By way of a numerical example, assuming that component FOVs 30 have horizontal and vertical view angles θ and φ respectively equal to 62° and 77°, compound FOV 130 has a wide horizontal view angle Θ=124° and a vertical view angle equal to 77°, and maintains a LAS value equal to 126. If light source 122 provides optical power equal to twice that of light source 22 (FIGS. 1A and 1B) pixels 52 in compound camera 20 will be exposed to a same level of radiance for imaging features in enlarged compound FOV 130 as are pixels 52 of 3D TOF camera 20 for imaging features in "small" FOV 30 shown in FIGS. 1A and 1B.

By way of a second numerical example, assume a 3D TOF camera having a wide angle enlarged FOV characterized by a horizontal view angle of about 140° and a vertical view angle of about 90° is desired for a particular application. Assume further that images provided by the camera are to be processed to provide distance measurements at a spatial sampling pitch of about 0.7 cm and therefore a resolution patch 0.7 cm on a side.

A compound camera in accordance with an embodiment of the invention similar to compound camera 100 that provides the desired view angles and spatial resolution may comprise component cameras 120 having FOVs 30 characterized by horizontal view angles equal to about 70° and vertical view angles equal to about 90°. Optionally, each component camera comprises a photosensor 50 having 480 horizontal rows and 640 vertical columns of 7.5μ×7.5μ pixels and resultant horizontal and vertical dimensions H and V equal to 3.6 mm and 4.8 mm respectively. The component camera would have a focal length f equal to 2.5 mm, f# optionally equal to 1.3, and vignetting factor $\bar{V}$ equal to 0.66. A characteristic LAS number for the component camera and for the compound 3D TOF camera is equal to about 22.

FIG. 3A schematically shows a plan view of another compound 3D TOF camera 150, in accordance with an embodiment of the invention.

Compound 3D TOF camera 150 comprises the same component cameras 120 as does compound 3D TOF camera 100 (FIGS. 2A and 2B) and provides an enlarged FOV 130 having horizontal view angle Θ=2θ. However, whereas in compound camera 100 (FIGS. 2A and 2B) component cameras 120 are rotated with respect to each other to rotate their respective optical axes 44 and FOVs 30, in compound 3D TOF camera 150 the component cameras are aligned parallel to each other. Compound camera 150 comprises a prism 152 for each component camera 120, which rotates their respective optical axes 44 and FOVs 30 by angles equal to θ/2 to produce enlarged FOV 130.

It can be technically difficult to provide a 3D TOF camera having a wide angle FOV similar to that which characterizes compound 3D TOF cameras in accordance with embodiments of the invention, such as the compound cameras shown in FIG. 2A-FIG. 3A.

For example, consider a conventional 3D TOF camera configured similarly to camera 20 (FIGS. 1A and 1B) but having a FOV characterized by a same 124° wide horizontal view angle as that specified in the first numerical example discussed above for compound 3D TOF camera 100 shown in FIGS. 2A and 2B. To provide the horizontally enlarged 124° view angle FOV, the conventional wide angle 3D TOF camera might comprise a photosensor having a horizontal dimension H (FIG. 1B) that is larger than the 3.6 mm noted in the exemplary numerical specification given for camera 20. In particular, the photosensor in the conventional wide angle 3D TOF camera might have a commercially available ½" standard format (8 mm diagonal dimension) and have a horizontal, H dimension, (FIG. 1B) equal to 7.3 mm and vertical dimension V, equal to 3.3 mm Using equation 1) that relates focal length f to horizontal view angle θ and photosensor horizontal dimension H, a focal length f required by lens 40 for the conventional wide angle camera is equal to 2.1 mm. The lens will have an f# equal to 1.8 and a vignetting factor V=0.21. To meet the same imaging resolution criterion as that met in the numerical example given above for compound camera 100, pixels 52 in photosensor 50 should have a side length equal to 10.4μ. Using the above values for components of the conventional 124° horizontal view angle 3D TOF camera, the conventional camera will have a LAS equal to about 23.

The LAS value for the conventional camera is about ⅙ that of the LAS value, 126, of the 3D TOF cameras 100 and 150. For a same working environment, the conventional wide horizontal view angle 3D TOF camera requires a light source for imaging a scene that delivers six times the optical power as that required by a 3D TOF camera in accordance with an embodiment of the invention having the same wide horizontal view angle to image the scene.

For comparison with the second numerical example given above for a 3D TOF camera in accordance with an embodiment of the invention, a conventional camera that provides horizontal and vertical view angles equal respectively to about 140° and about 90°, might comprise a photosensor having 5μ×5μ pixels and horizontal and vertical dimensions equal to 8.5 mm and 3.2 mm respectively. The lens would have an effective focal length equal to about 1.65 mm, an f# optionally equal to 2.4, and a resulting vignetting factor V equal to 0.15. The conventional camera would have a LAS equal to about 0.65, which is about 1/34 that of the LAS for the corresponding compound camera in accordance with an embodiment of the invention specified by the second numerical example.

In the above description of compound cameras 100 and 150 (FIGS. 2A-3A), the angle between optical axes 44 of component cameras 120 comprised in the compound cameras is equal to θ and the respective enlarged FOVs 130 of the compound cameras have a wide view angle $\Theta=2\theta$. However, wide angle FOVs for a compound camera in accordance with an embodiment of the invention may be provided by angles between optical axes 44 of the compound camera's component cameras 120 that are different from the field of view angle $\theta$ of the component cameras.

FIG. 3B schematically shows a plan view of a compound camera 170 in accordance with an embodiment of the invention comprising two component cameras 120 having FOV view angles $\theta$, and an angle $(\theta+\alpha)$ between their respective optical axes 44, where by way of example, $\alpha$ is greater than zero. Compound camera 170 has a FOV 171 having a view angle $\Theta=(2\theta+\alpha)$. A seam 172 for which FOVs of component cameras 120 overlap is no longer planar as are seams 102 in compound cameras 100 and 150, but has a cross section that decreases with distance from compound camera 170 and at a distance "Z" from the camera disappears.

Whereas a possible advantageous increase in angle of view of FOV is provided by the positive value of $\alpha$, a dead zone, shown as a shaded region 173 in FIG. 3B, is generated in FOV 171 of the compound camera for which neither component camera 120 provides imaging. Dead zone 173, begins at distance Z from compound camera 170, which may be estimated by an expression $Z=\Delta/2\tan(\alpha/2)$, where $\Delta$ is a distance between optical centers 42 of component cameras 120. For small angles $\alpha$, Z is equal to about $\Delta/\alpha$.

An upper limit on $\alpha$ is optionally determined by constraining distance Z to be greater than a desired depth of field for which compound camera 170 is intended to provide continuous, uninterrupted, imaging. For example, if compound camera 170 is intended to provide uninterrupted imaging up to a depth of field equal to 2 m from camera 170, and $\Delta$ is equal to 2 cm, then an upper limit for a is equal to about 0.6 degrees.

Were $\alpha$ to be less than zero in FIG. 3B, $\Theta=(2\theta+\alpha)$ would of course be less than $2\theta$, and width of a seam for which the FOVs of component cameras 120 overlap would increase with distance from compound camera 170. Unless the increasing width of the seam were advantageous, for example, for use in possibly providing enhanced calibration for component cameras 120, use of cameras 120 would in general be inefficient. For example, the cameras could be replaced by possibly less expensive cameras having smaller photosensors 50. In general, it is advantageous for $\alpha$ to be greater than or equal to zero. A lower bound on $\alpha$ is optionally determined so that inefficiency in use of component cameras 120 is moderated.

Figure 3C:
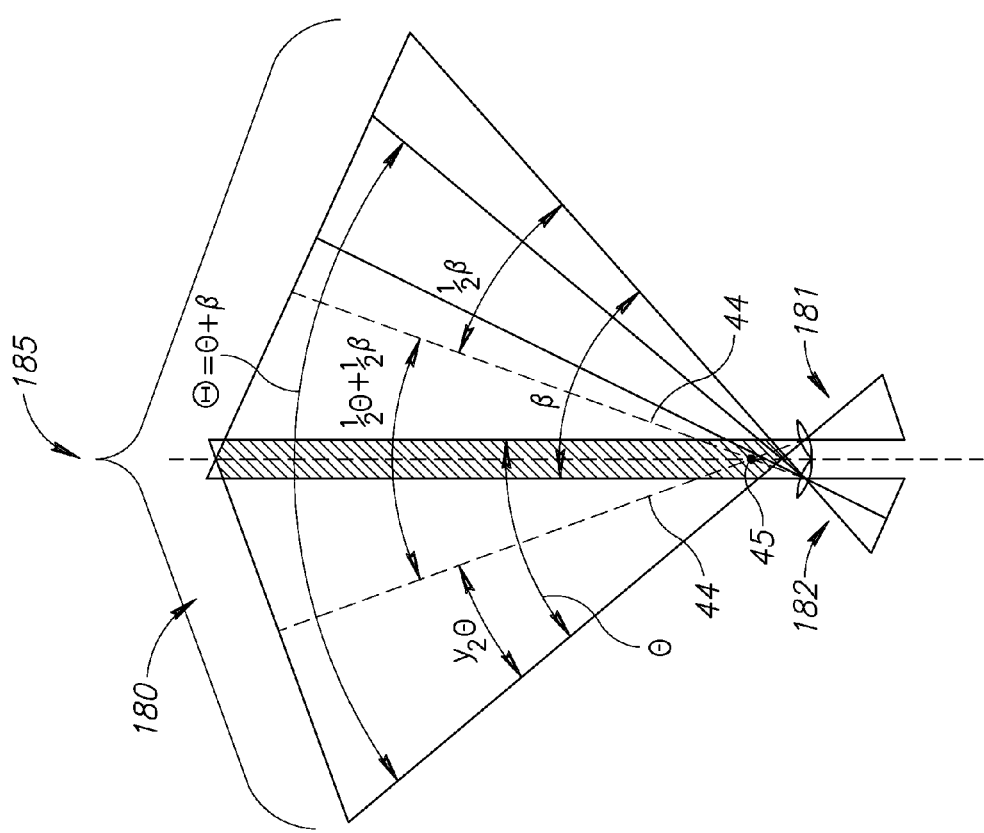
Figure 4:
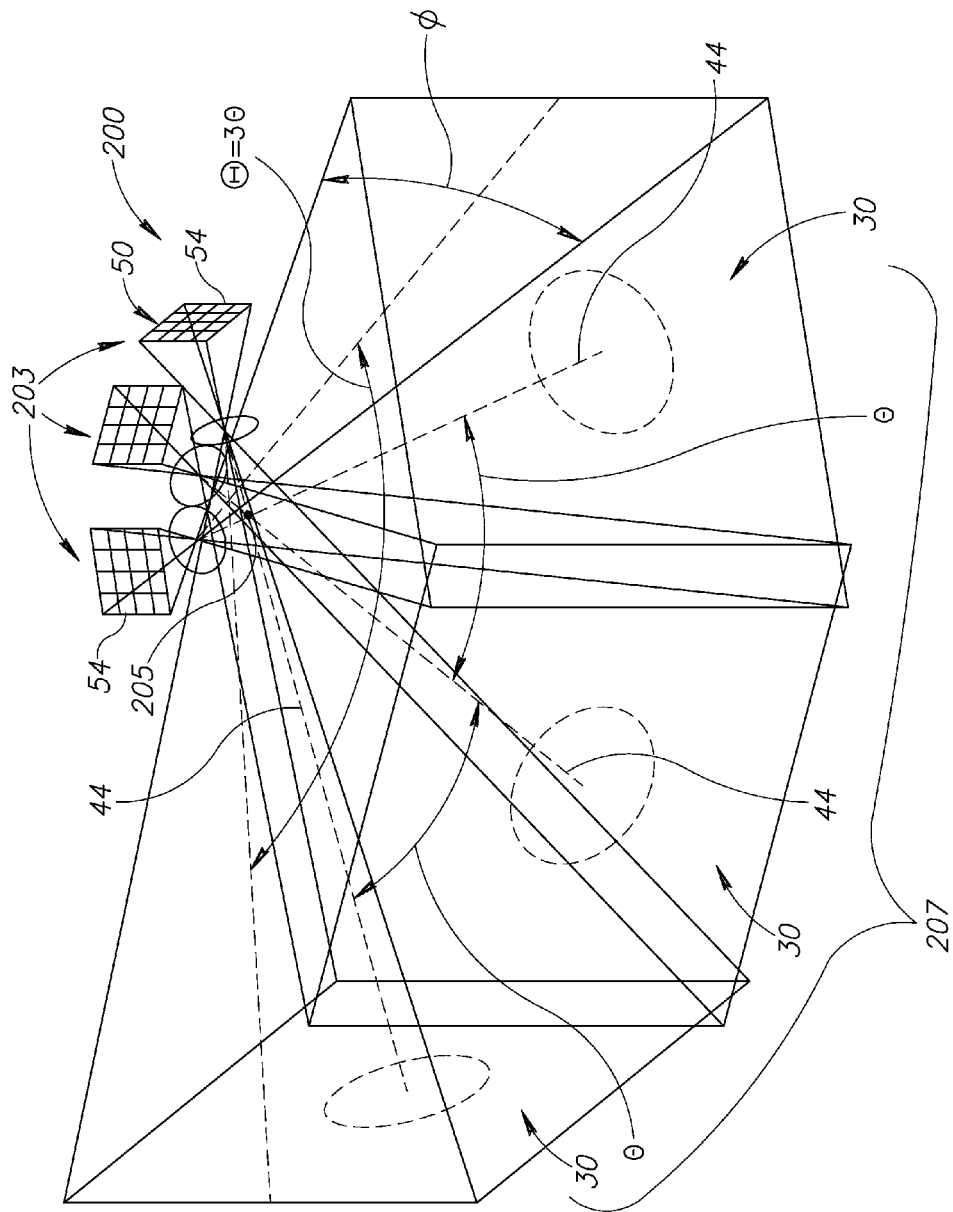
FIG. 4 schematically shows an active illumination imaging system comprising three component cameras, in accordance with an embodiment of the invention.

In the above description, compound cameras in accordance with embodiments of the invention are shown comprising identical component cameras that have identical FOVs. However, embodiments of the invention are not limited to compound cameras comprising component cameras having identical FOVs. For example, a compound camera in accordance with an embodiment of the invention may comprise component cameras having different FOVs. FIG. 3C schematically shows a plan view of a compound camera 180 comprising a first component camera 181 having a horizontal view angle $\theta$ and a second component camera 182 having a horizontal view angle $\beta$. The component cameras are positioned so that their respective optical axes intersect at an angle equal to $\frac{1}{2}(\theta+\beta)$ to provide a FOV 185 having a wide horizontal view angle $\Theta=(\theta+\beta)$.

Whereas in the above description compound cameras are shown comprising two component cameras, a compound camera in accordance with an embodiment of the invention may comprise more than two component cameras. By way of example, a compound camera 200 comprising three, optionally identical, component cameras 203, in accordance with an embodiment of the invention, is schematically shown in a perspective view in FIG. 4. Each component camera 203 has a photosensor 50 having vertical edges 54 (only some of which are labeled in the figure), an optical axis 44 and a FOV 30 characterized by a horizontal view angle $\theta$.

In compound camera 200, component cameras 203 are configured so that their optical axes 44 are substantially coplanar and optionally intersect at a same intersection region 205. Optical axes 44 are considered to intersect in a same intersection region if points of closest approach of any two of the three axes are contained in same region of intersection having a diameter less than a suitable upper bound. The optical axes are considered to be substantially coplanar if an angle between a plane defined by any two of the axes is less than an upper bound angle for which distortions in images provided by the camera are not so severe as to render the images unusable for an application for which compound camera 200 is intended. Vertical edges 54 of photosensors 50 are perpendicular to the plane of optical axes 44. An angle between any two adjacent optical axes 44 is equal to $\theta$. The compound 3D TOF camera therefore has a compound FOV 207, having a horizontal view angle $\Theta=3\theta$.

Figure 5:
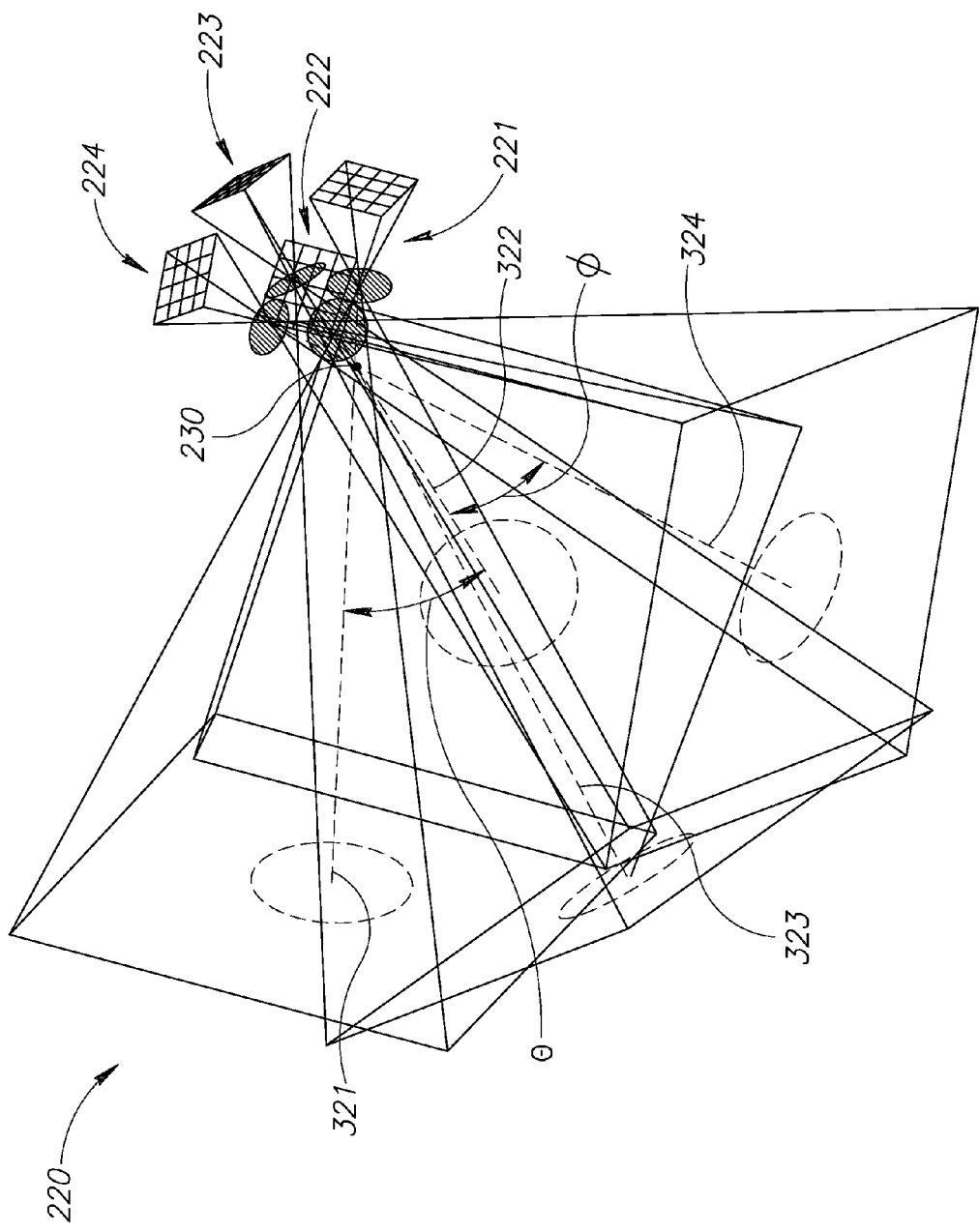
FIG. 5 schematically shows an active illumination imaging system comprising four component cameras, in accordance with an embodiment of the invention.

FIG. 5 schematically shows a 3D TOF camera 220 comprising four, optionally identical component cameras 221, 222, 223, and 224, having optical axes 321, 322, 323, and 324 respectively, and a FOV 30 having a horizontal view angle $\theta$ and a vertical view angle $\phi$, in accordance with an embodiment of the invention. In an embodiment of the invention all optical axes 321, 322, 323, and 324 intersect at a same intersection region 230. The cameras are oriented so that an angle between optical axes 321 and 322 and an angle between optical axes 323 and 324 are equal to $\theta$. Similarly, the cameras are oriented so that an angle between optical axes 321 and 323 and an angle between optical axes 322 and 324 are equal to $\phi$. Compound camera 150 therefore has a compound FOV characterized by a horizontal view angle $\Theta=2\theta$ and a vertical view angle $\Phi=2\phi$.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. An active illumination imaging system comprising:
    a light source to illuminate a scene imaged by a camera; and
    first and second cameras, each comprising an optical system having an optical axis and a photosensor having pixels on which the optical system is to imagine light, and a field of view (FOV) characterized by a view angle in a plane that contains the optical axis;
    wherein the optical axes of the first and a second cameras intersect at an intersection region common to their FOVs at an angle substantially equal to half a sum of their view angles to provide the imaging system with an enlarged FOV having an enlarged view angle in a plane defined by the intersecting optical axes that is substantially equal to a sum of the view angles of the cameras, and in which, intersections of the FOVs of the cameras with the plane that are adjacent to each other, are substantially parallel.

2. The active illumination imaging system according to claim 1 wherein the view angles of the first and second cameras are equal.

3. The active illumination imaging system according to claim 1 wherein the view angles of the first and second cameras are not equal.

4. The active illumination imaging system according to claim 1 wherein the enlarged view angle is greater than or equal to 90°.

5. The active illumination imaging system according to claim 4 wherein the enlarged view angle is greater than or equal to 120°.

6. The active illumination imaging system according to claim 5 wherein the enlarged view angle is greater than or equal to 150°.

7. The active illumination imaging system according to claim 1 and comprising a third camera whose optical axis intersects the optical axis of the second camera.

8. The active illumination imaging system according to claim 7 wherein a plane defined by the optical axes of the second and third cameras is substantially coincident with the plane defined by the optical axes of the first and second cameras.

9. The active illumination imaging system according to claim 8 wherein the axes of the second and third cameras intersect at an angle substantially equal to half a sum of the view angles of the second and third cameras.

10. The active illumination imaging system according to claim 7 wherein a plane defined by the optical axes of the second and third cameras is substantially perpendicular to the plane defined by the optical axes of the first and second cameras.

11. The active illumination imaging system according to claim 10 wherein the second camera has a view angle in the plane defined by the optical axes of the second and third cameras and the optical axes of the second and third cameras intersect at an angle substantially equal to half a sum of the view angle of the third camera plus the view angle of the second camera in the plane of the optical axes of the second and third cameras.

12. The active illumination imaging system according to claim 1 wherein the cameras are 3D cameras that provide distances to features in a scene that they image.

13. The active illumination imaging system according to claim 12 wherein the 3D cameras are time of flight cameras (TOF) cameras.

14. An imaging system comprising:
a first camera and a second camera, each having an optical axis and a field of view (FOV) characterized by a view angle in a plane that contains the optical axis;
wherein the optical axes of the cameras intersect at an intersection region common to their FOVs at an angle substantially equal to half a sum of their view angles to provide the imaging system with an enlarged FOV having an enlarged view angle in a plane defined by the intersecting optical axes that is substantially equal to a sum of the view angles of the cameras, and in which, intersections of the FOVs of the cameras with the plane that are adjacent to each other, are substantially parallel.

15. The imaging system according to claim 14 wherein a measure of the system's sensitivity to light that it images is equal to a product of an average vignetting factor of the imaging system times a square of a quotient equal to a diameter of pixels in the imaging system divided by a minimum f# of imaging system, and the measure has a value greater than 20.

16. The imaging system according to claim 15 wherein the measure has a value greater than 50.

17. The imaging system according to claim 15 wherein the measure has a value greater than 100.

18. The imaging system according to claim 15 wherein the measure has a value greater than 120.

19. The imaging system according to claim 14 comprising an enlarged FOV having an enlarged view angle in a plane defined by the intersecting optical axes that is substantially equal to a sum of the view angles of the cameras.

* * * * *